(12) United States Patent
Nakamura et al.

(10) Patent No.: US 7,137,197 B2
(45) Date of Patent: Nov. 21, 2006

(54) METHOD OF MANUFACTURING A PISTON HAVING A HOLLOW PISTON HEAD

(75) Inventors: Shinji Nakamura, Isesaki (JP); Yutaka Hasegawa, Isesaki (JP)

(73) Assignee: Sanden Corporation, Gunma (JP)

( * ) Notice: Subject to any disclaimer, the term of this patent is extended or adjusted under 35 U.S.C. 154(b) by 115 days.

(21) Appl. No.: 10/396,501

(22) Filed: Mar. 26, 2003

(65) Prior Publication Data

US 2003/0183076 A1 Oct. 2, 2003

(30) Foreign Application Priority Data

Mar. 28, 2002 (JP) .............................. 2002-090841

(51) Int. Cl.
*B28P 11/00* (2006.01)
*B23P 15/10* (2006.01)
(52) U.S. Cl. ........................ 29/888.042; 29/888.044; 29/520
(58) Field of Classification Search ........... 29/888.042, 29/888.044, 520
See application file for complete search history.

(56) References Cited

U.S. PATENT DOCUMENTS

| | | | | |
|---|---|---|---|---|
| 2,216,987 A | * | 10/1940 | Rose | 29/888.044 |
| 2,852,843 A | * | 9/1958 | Banta et al. | 29/520 |
| 2,918,338 A | * | 12/1959 | Grad | 92/157 |
| 3,055,100 A | * | 9/1962 | Kimpel | 29/520 |
| 5,014,601 A | * | 5/1991 | Sundholm | 29/516 |
| 5,461,967 A | | 10/1995 | Burkett et al. | |
| 5,490,767 A | | 2/1996 | Kanou et al. | |
| 5,724,733 A | * | 3/1998 | Engel et al. | 29/888.044 |
| 5,765,464 A | | 6/1998 | Morita | |
| 5,899,135 A | | 5/1999 | Kanou et al. | |
| 5,988,041 A | | 11/1999 | Hiramatsu et al. | |
| 6,024,009 A | | 2/2000 | Morita | |
| 6,216,584 B1 | | 4/2001 | Terauchi | |
| 6,318,236 B1 | | 11/2001 | Miyazawa et al. | |
| 2001/0027721 A1 | * | 10/2001 | Kato et al. | 92/172 |
| 2003/0044292 A1 | | 3/2003 | Shiina | |

FOREIGN PATENT DOCUMENTS

JP 10159725 10/1996

* cited by examiner

*Primary Examiner*—F. Daniel Lopez
(74) *Attorney, Agent, or Firm*—Baker Botts L.L.P.

(57) ABSTRACT

A method of manufacturing a piston using a swaging tool includes the step of positioning a portion of a first member and a portion of a second member of the piston within a first end of an opening formed through the swaging tool, such that a reduced diameter portion of the second member is substantially aligned with a first ring portion of the first member and an end portion of the second member contacts a second ring portion of the first member to create an annular space adjacent to the first ring portion and the reduced diameter portion. The method also includes the step of subsequently swaging the first ring portion by moving the first ring portion in a direction toward a second end of the swaging tool, such that a portion of the first ring portion is positioned within the annular space to fix the first member to the second member.

10 Claims, 10 Drawing Sheets

METHOD OF MANUFACTURING A PISTON HAVING A HOLLOW PISTON HEAD

BACKGROUND OF THE INVENTION

1. Field of the Invention

The present invention relates generally to compressors, pistons for use in such compressors, and methods of manufacturing such compressors and pistons. In particular, the present invention is directed towards methods of manufacturing the piston of the compressor using a swaging tool.

2. Description of Related Art

Known methods of manufacturing a piston, such as the method described in Japanese Publication No. JP-A-10-159725, use a disc-shaped lid member and a cup member. The lid member forms an end surface of a piston head and the cup member includes a cylindrical portion. The bottom of the cup member is formed integrally with a connector for connecting the cup member to a swash plate. The cylindrical portion forms a peripheral surface of the piston head and has an open end, and the open end forms a brim of the cup member. The lid member closes the open end of the cylindrical portion, and a swaging tool is used to swag the brim of the cup member which forms a sealed cavity within the piston head. Specifically, the brim of the cup member is sealed to the lid member.

SUMMARY OF THE INVENTION

Therefore, a need has arisen for a method of manufacturing a piston having a hollow head which overcome these and other short comings of the related art. A technical advantage of the present invention is that a method of manufacturing a piston is used, which reduces the cost of manufacturing the piston.

According to an embodiment of the present invention, a piston is manufactured using a swaging tool. The swaging too has an opening formed therethrough. The opening comprises a first inner portion extending from a first end of the swaging tool, and an inner diameter of the first inner portion is substantially constant. The opening also comprises a second inner portion extending from a second end of the swaging tool. The second inner portion is tapered and is formed integrally with the first inner portion, such that an inner diameter of the second inner portion at the second end of the swaging tool is greater than an inner diameter of the second inner portion at the first inner portion. The piston comprises a first member, and the first member comprises a first ring portion having an outer diameter which is greater than the inner diameter of the first inner portion. The first member also comprises a second ring portion which is connected to the first ring portion, and the second ring portion has an outer diameter which is about equal to the diameter of the first inner portion. The piston also comprises a second member, and the second member comprises an end portion having an outer diameter which is about equal to an inner diameter of the second ring portion. The second member also comprises a reduced diameter portion connected to the end portion, and the reduced diameter portion has an outer diameter which is less than the outer diameter of the end portion. The method of manufacturing the piston comprises the step of positioning at least one portion of the first member within the second inner portion via the second end of the swaging tool. The method also comprises the step of positioning at least one portion of the second member within the second inner portion via the second end of the swaging tool, such that the end portion contacts the second ring portion and the reduced diameter portion is substantially aligned with the first ring portion to create an annular space adjacent to the first ring portion and the reduced diameter portion. Moreover, the method comprises the step of subsequently swaging, e.g., tapering (uniform tapering or non uniform tapering) or reducing the diameter of at least a portion of, the first ring portion by moving the first ring portion in a direction toward the first end of the swaging tool, such that at least a portion of the first ring portion is positioned within at least a portion of the annular space to fix the first member to the second member.

According to another embodiment of the present invention, a piston is manufactured using a swaging method. The piston comprises a hollow piston head, and the hollow piston head comprises a first member. The first member comprises a cylindrical portion having an outer diameter which is equal to an outer diameter of the hollow piston head, and an inner diameter which is less than the outer diameter of the hollow piston head. The cylindrical portion comprises a flange portion extending radially from an outer surface of the cylindrical portion. The piston head also comprises a second member. The second member comprises an annular groove formed therein, and at least one portion of the second member has an outer diameter which is about equal to the inner diameter of the cylindrical portion. The method of manufacturing the piston head comprises the step of positioning the at least one portion of the second member within the cylindrical portion of the first member, such that the flange portion is positioned adjacent to and, outside the annular groove. The method also comprises the step of subsequently swaging the flange portion, such that at least a portion of the flange portion is positioned within the groove to fix the first member to the second member.

According, to an embodiment of the present invention, a compressor comprises a piston, and the piston of the compressor is manufactured using a swaging tool. The swaying tool has an opening formed therethrough. The opening comprises a first inner portion extending from a first end of the swaging tool, and an inner diameter of the first inner portion is substantially constant. The opening also comprises a second inner portion extending from a second end of the swaging tool. The second inner portion is tapered and is formed integrally with the first inner portion, such that an inner diameter of the second inner portion at the second end of the swaging tool is greater than an inner diameter of the second inner portion at the first inner portion. The piston comprises a first member, and the first member comprises a first ring portion having an outer diameter which is greater than the inner diameter of the first inner portion. The first member also comprises a second ring portion which is connected to the first ring portion, and the second ring portion has an outer diameter which is about equal to the diameter of the first inner portion. The piston also comprises a second member, and the second member comprises an end portion having an outer diameter which is about equal to an inner diameter of the second ring portion. The second member also comprises a reduced diameter portion connected to the end portion, and the reduced diameter portion has an outer diameter which is less than the outer diameter of the end portion. The method of manufacturing the piston comprises the step of positioning at least one portion of the first member within the second inner portion via the second end of the swaging tool. The method also comprises the step of positioning at least one portion of the second member within the second inner portion via the second end of the swaging tool, such that the end portion contacts the second ring portion and the reduced diameter portion is substantially aligned with the first ring portion to create an annular pace adjacent to the first ring portion and the reduced diameter portion. Moreover, the method comprises the step of subsequently swaging, e.g., tapering (uniform tapering or non uniform tapering) or reducing the diameter of at least a portion of, the first ring portion by moving the first ring portion in a direction toward the first end of the swaging tool, such that at least a portion of the first in a portion is positioned within at least a portion of the annular space to fix the first member to the second member.

According to another embodiment of the present invention, a compressor comprises a piston, and the piston is manufactured using a swaging method. The piston comprises a hollow piston head, and the hollow piston head comprises a first member. The first diameter of the hollow piston head, and an inner diameter which is less than the outer diameter of the hollow piston head. The cylindrical portion comprises a flange portion extending radially from an outer surface of the cylindrical portion. The piston head also comprises a second member. The second member comprises an annular groove formed therein, and at least one portion of the second member has an outer diameter which is about equal to the inner diameter of the cylindrical portion. The method of manufacturing the piston head comprises the step of positioning the at least one portion of the second member within the cylindrical portion of the first member, such that the flange portion is positioned adjacent to and outside the annular groove. The method also comprises the step of subsequently swaging the flange portion, such that at least a portion of the flange portion is positioned within the groove to fix the first member to the second member.

A piston manufactured using a swaging tool comprises a hollow piston head. The hollow piston head comprises a first member, and the first member, comprises a cylindrical portion. The cylindrical portion has, an outer diameter which is equal to an outer diameter of the hollow piston head, and an inner diameter which is less than the outer diameter of the hollow piston head. Moreover, the cylindrical portion comprises a flange portion extending radially from an outer surface of the cylindrical portion. The hollow piston head also comprises a second member. The second member comprises an annular groove formed therein for receiving at least a portion of the flange portion. Moreover, at least one portion of the second member has an outer diameter which is about equal to the inner diameter of the cylindrical portion.

A compressor comprising a piston manufactured using a swaging tool comprises a hollow piston head. The hollow piston head comprises a first member, and the first member comprises a cylindrical portion. The cylindrical portion has an outer diameter which is equal to an outer diameter of the hollow piston head, and an inner diameter which is less than the outer diameter of the hollow piston head. Moreover the cylindrical portion comprises a flange portion extending radially from an outer surface of the cylindrical portion. The hollow piston head also comprises a second member. The second member comprises an annular groove formed therein for receiving at least a portion of the flange portion. Moreover, at least one portion of the second member has an outer diameter which is about equal to the inner diameter of the cylindrical portion.

Other objects, features, and advantage will be apparent to persons of ordinary skill in the art from the following detailed description of the invention and accompanying drawings.

BRIEF DESCRIPTION OF THE DRAWINGS

For a more complete understanding of the present invention, the needs satisfied thereby, and the objects, features, and advantages thereof, reference now is made to the following description taken in connection with the accompanying drawings.

DETAILED DESCRIPTION OF THE PREFERRED EMBODIMENTS

Preferred embodiments of the present invention and their features and advantages may be understood by referring to FIGS. 1–18, like numerals being used for like corresponding parts in the various drawings.

Figure 1:
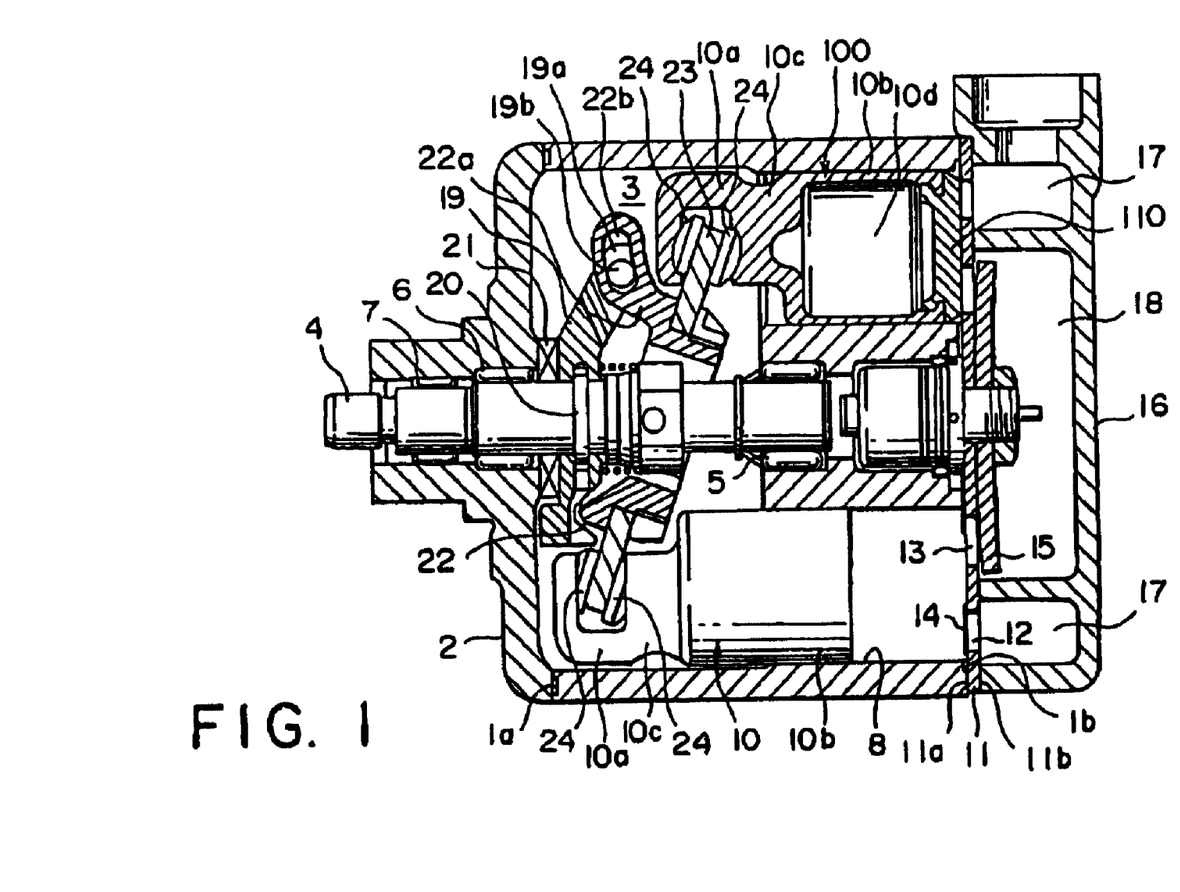
FIG. 1 is a cross-sectional view of a compressor having a piston manufactured by a method according to a first embodiment of the present invention.

Referring to FIG. 1, a compressor 50, e.g., a swash plate, variable displacement-type compressor, may comprise a plurality of pistons 10 manufactured by a method according to a first embodiment of the present invention. Compressor 50 also may comprise a cylinder block 1, a front housing 2, a crank chamber 3, and a drive shaft 4. Specifically, cylinder block 1 may comprise a front end 1a and a rear end 1b, and front housing 2 may be fixed to front end 1a to form crank chamber 3. Cylinder block 1 may have a first center hole (not shown) formed therethrough, and front housing 2 may have a second center hole (not shown) formed therethrough. Cylinder block 1 and front housing 2 may support drive shaft 4 via a first radial bearing 5 positioned within the first center hole and a second radial bearing 6 positioned within the second center hole, respectively, such that drive shaft 4 may rotate. Drive shaft 4 may extend in an axial direction, such that a first end of drive shaft 4 is positioned outside front housing 2. Moreover, a sealing member 7 may be positioned within the second center hole, such that sealing member 7 provides a seal for crank chamber 3.

Cylinder block 1 also may comprise a plurality of cylinder bores 8 formed therein, and each piston 10 may be positioned within a corresponding one of cylinder bores 8, such that each piston 10 reciprocates independently with the corresponding one of cylinder bores 8. The number of cylinder bores 8 may correspond to the number of pistons 10 used in compressor 50. For example, in an embodiment, compressor 50 may comprise seven (7) pistons. Moreover, each piston 10 may comprise a cup member 100 and a lid member 110, and cup member 100 may comprise a shoe supporter 10a, a piston head 10b, and a neck portion 10c which connects shoe supporter 10a to piston head 10b. In an embodiment, cup member 100 and lid member 110 may be made from different materials, e.g., cup member 100 may be aluminum and lid member 110 may be iron. In another embodiment, cup member 100 and lid member 110 may be made from the same material e.g., aluminum.

Compressor 50 also may comprise a valve plate 11, a cylinder head 16 fixed to valve plate 11, a suction chamber 17 formed within cylinder head 16, and a discharge chamber 18. formed within cylinder head 16. Valve plate 11 may comprise a front surface 11a and a rear surface 11b, and a pair of suction ports 12 and a pair of discharge ports 13 may be formed through valve plate 11. Moreover, a plurality of suction valves 14, e.g., a plurality of suction reed valves, may be fixed to front surface 11a, such that suction valves 14 are positioned between piston 10 and a corresponding one of suction ports 12. Similarly, a plurality of discharge valves 15, e.g., a plurality of discharge reed valves, fixed to rear surface 11b, such that discharge port 13 is positioned between piston 10 and a corresponding one of discharge valves 15. When one of pistons 10 moves in a direction toward front housing 2, a free end of a corresponding one of suction valves 14 and a corresponding one of discharge valves 15 also moves toward front housing 2, such that fluid inside suction chamber 17 is drawn into a corresponding one of cylinder bores 8 via a corresponding one of suction ports 12, and the corresponding discharge valve 15 covers a corresponding one of discharge ports 13. Similarly, when piston 10 moves in a direction away from front housing 2, the free end of the corresponding suction valve 14 and the corresponding discharge valve 15 moves away from front housing 2, such that the fluid inside the corresponding cylinder bore 8 is driven into discharge chamber 18 via the corresponding discharge port 13, and the corresponding suction valve 14 covers the corresponding suction port 12.

Compressor 50 also may comprise a swash plate 23, and a rotor 19 positioned within crank chamber 3 and fixed to drive shaft 4 via a pin 20. Rotor 19 also may be supported by font housing 2 via a thrust bearing 21, and may comprise a first arm portion 19a. A boss 22 may be mounted slidably to drive shaft 4, such that boss 22 may be inclined relative to drive shaft 4. Specifically, boss 22 may comprise a second arm portion 22a having an elongated opening 22b formed therethrough, such that first arm portion 19a may be connected to second arm portion 22a via a pin 19b positioned within elongated opening 22b. Moreover, swash plate 23 may be fixed to boss 22, such that when the inclination angle of boss 22 relative to drive shaft 4 is altered, the inclination angle of swash plate 23 relative to drive shaft 4 also is altered. Further, each piston 10 may be connected to swash plate 23 via a corresponding pair of shoes 24, and shoes 24 may be supported by shoe supporter 10a of piston 10, such that shoes 24 slide along an inner surface of shoe supporter 10a.

In operation, when a driving source, e.g., an engine of a vehicle, rotates drive shaft 4, swash plate 23 also rotates. Specifically, swash plate 23 slides between each pair of shoes 24, and each pair of shoes 24 slide along the inner surface of their corresponding shoe supporter 10a. The rotational movement of swash plate 23 may be converted into a linear reciprocating movement which may be transmitted to piston 10. Consequently, piston 10 reciprocates within a corresponding one of cylinder bores 8. As piston 10 reciprocates, refrigerant is drawn into the corresponding cylinder bore 8 from suction chamber 17, and piston 10 compresses the refrigerant. The compressed refrigerant subsequently is discharged into discharge chamber 18.

Figure 2:
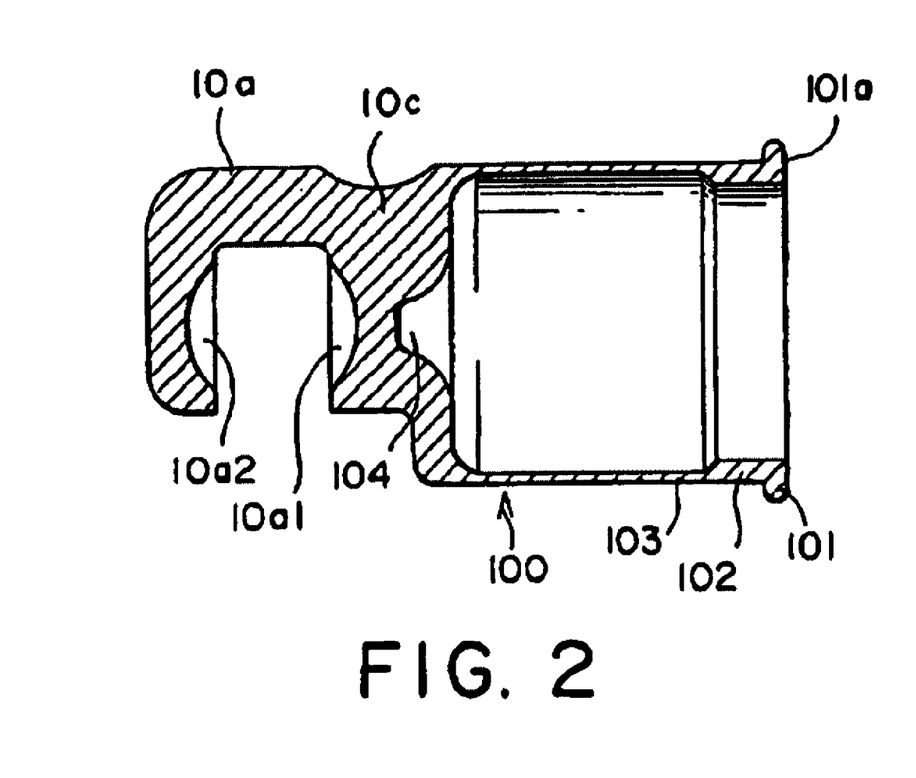
FIG. 2 is a cross-sectional view of a cup member of the piston in FIG. 1.

Referring to FIG. 2, in this embodiment, cup member 100 may comprise a first ring portion 101, a second ring portion 102, and a cylindrical portion 103. Second ring portion 102 and cylindrical portion 103 form a peripheral surface of piston head 10b. In an embodiment, second ring portion 102 may have a thickness which is greater than a thickness of cylindrical portion 103, and an annular groove (not shown) for receiving a piston ring (not shown) may be formed within second ring portion. In another embodiment, e.g., when the piston ring is not employed, the thickness of second ring portion 102 may be about equal to the thickness of cylindrical portion 103. Nevertheless, in either of these embodiments, second ring portion 102 and cylindrical portion 103 may have substantially the same outer diameter measured from a center of piston head 10b. Neck portion 10c may be formed integrally with cylindrical portion 103, and may form a bottom of cup member 100. Neck portion 10c also may have a recess 104 formed therein, which reduces a weight of piston 10. Moreover, neck portion 10c may be formed integrally with shoe supporter 10a, and shoe supporter 10a may have a pair of concave surfaces 10a1 and 10a2 formed therein, which support a corresponding pair of shoes 24.

First ring portion 101 forms a brim of cup member 100, and has a surface 101a which forms an end surface of cup member 100. An outer diameter of first ring portion 101 may be greater than the outer diameter of second ring portion 102 measured from the center of piston head 10b. In an embodiment, an inner diameter of first ring portion 101 may be equal to the inner diameter of second ring portion 102 measured from center of piston head 10b. In another embodiment, the inner diameter of first ring portion 101 may be greater than the inner diameter of second ring portion 102. In yet another embodiment, the inner diameter of first ring portion 101, may increase between second ring portion 102 and surface 101a.

Figure 3:
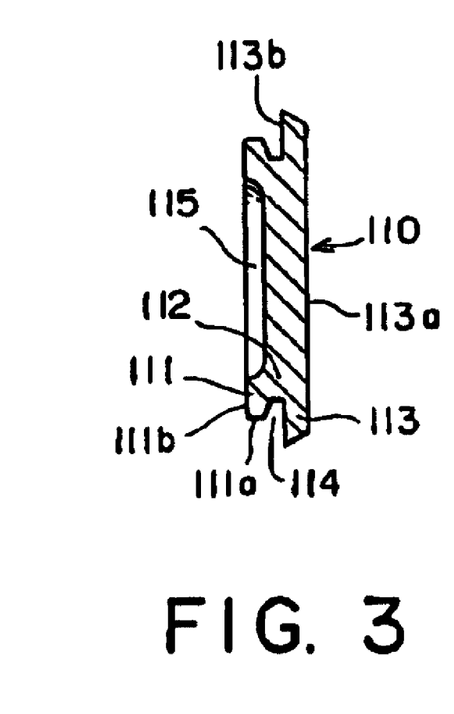
FIG. 3 is a cross-sectional view of a lid member of the piston in FIG. 1.

Referring to FIG. 3, lid member 110 may comprise end portion 111, e.g., a ring-shaped end portion or disc-shaped end portion, a disc portion 113, and a reduced diameter portion 112 positioned between end portion 111 and disc portion 113. End portion 111, reduced diameter portion 112, and disc portion 113 may form an annular groove 114, and a recess 115 may be formed in end portion 111 and reduced diameter portion 112 to reduce the weight of lid member 110. A periphery 111a of end portion 111 may have an outer diameter which is about equal to the inner diameter of second ring portion 102. In this embodiment, reduced diameter portion 112 may comprise a first portion connected to end portion 111 and a second portion connected to disc portion 113. Specifically, an outer diameter of the second portion of reduced diameter portion 112 may be constant, and an outer diameter the first portion of reduced diameter portion 112 may decrease between end portion 111 and the second portion of reduced diameter portion 112. Moreover, disc portion 113 may have a first surface 113a which forms an end surface of piston head 10b and a second surface 113b opposite first surface 113a. Second surface 113b may be ring-shaped, and may abut surface 101a when end portion 111 and reduced diameter portion 112 are positioned within cup member 100. Disc portion 113 may have a cylindrical shape, or may be tapered.

Figure 4:
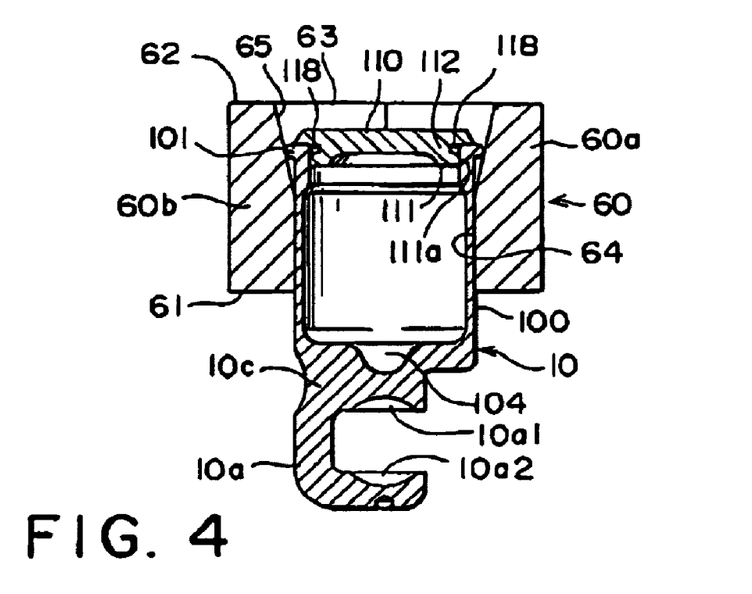
FIG. 4 is a cross-sectional view depicting a step of manufacturing the piston of FIG. 1.

Referring to FIG. 4, in this embodiment, a swaging tool 60 may comprise a first end 61, a second end 62, a first inner portion 64, and a second inner portion 65. Swaging tool 60 also may have a opening 63 formed therethrough. For example, in an embodiment, opening 63 may be a channel which divides swaging tool into a first semi-circular portion 60a and a second semi-circular portion 60b. First inner portion 64 may have a constant inner diameter, e.g., may have a cylindrical-shape, and second inner portion 65 may be tapered, such that an inner diameter of second inner portion 65 may increase between first inner portion 64 and second end 62. For example, the inner diameter of first inner portion 64 may be about equal to the outer diameter of piston head 10b, and the inner diameter of second inner portion 65 may be greater than the inner diameter of first inner portion 64.

In an embodiment of the present invention, cup member 100 may be inserted in opening 63 from second end 62, such that at least a portion of cylindrical portion 103 is aligned with first inner portion 64, first ring portion 101 and second ring portion 102 are aligned with second inner portion 65, and shoe supporter 10a extends beyond first end 61. First semi-circular portion 60a or second semi-circular portion 60b, or both, subsequently may be fitted to surround cylindrical portion 103, and semi-circular portion 60a and second semi-circular portion 60b then may be fixed to each other. Because semi-circular portion 60a and second semi-circular portion 60b are fixed to each other after shoe supporter 10a is positioned beyond first end 61, semi-circular portion 60a and second semi-circular portion 60b may surround cylindrical portion 103 even when shoe supporter 10a extends beyond cylindrical portion 103 in a radial direction. Nevertheless, in another embodiment, if shoe supporter 10a does not extend beyond cylindrical portion 103 in a radial direction, or if piston 10 has other means for coupling piston head 10 to swash plate 23, opening 63 may be formed, such that swaging tool 60 may be single body having the hole formed, therethrough, i.e., swaging tool 60 is not divided into first semi-circular portion 60a and second semi-circular portion 60b. In this embodiment, cup member 100 simply may be inserted into opening 63 from second end 62, such that at least a portion of cylindrical portion 103 is surrounded by first inner portion 64.

In any of the above-described embodiments, an adhesive may be applied to reduced diameter portion 112, and end portions 111 and reduced portion 112 subsequently may be inserted into cup member 100, such that surface 113b of lid member 110 contacts end surface 101a of first inner portion 101, periphery 111a of end portion 111 contacts the inner surface of second ring portion 102, and reduced diameter portion 112 is aligned with first ring portion 101. Moreover, an annular space 118, which is a portion of annular groove 114, may be formed between first ring portion 101 and reduced diameter portion 112 when end portion 111 and reduced diameter portion 112 is inserted into cup member 100.

Figure 5:
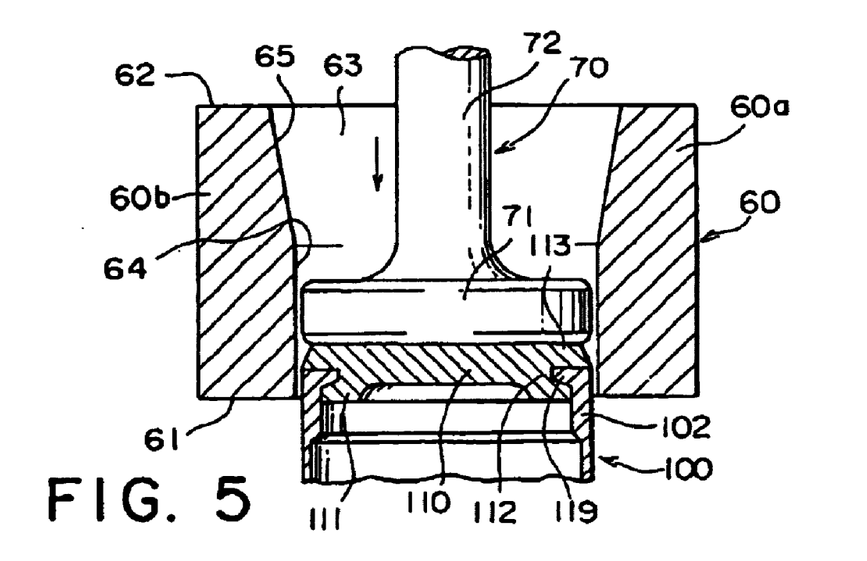
FIG. 5 is a cross-sectional view depicting another step of manufacturing the piston of FIG. 1.

Referring to FIG. 5, a pushing tool 70 may be used to push cup member 100 and lid member 110 toward first end 61 of swaging tool 60. Pushing tool 70 may comprise a disc portion 71 and a shaft portion 72 connected to the center of disc portion 71. When lid member 110 and cup member 110 are pushed within first inner portion 64, first inner portion 64 swags first ring portion 101 in a direction toward annular space 118, such that at least a portion of first ring portion 101 is positioned within annular space 118 and contacts the adhesive applied to reduced diameter portion 112. Consequently, cup member 110 may be fixed to lid member 110 without forming a gap between cup member 100 and lid member 110.

Figure 6:
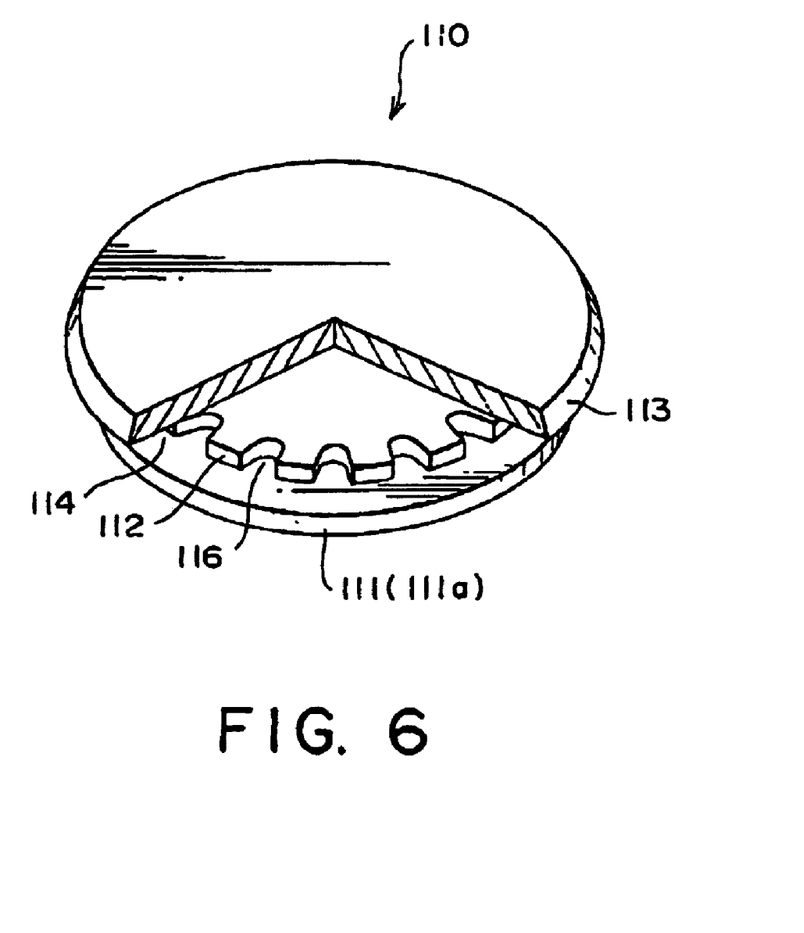
FIG. 6 is a partial cut away, perspective view of a modification of the lid member of FIG. 3.

Referring to FIG. 6, in a modification of this embodiment, reduced diameter portion 112 may have a plurality of cut-off portions 116 formed therein, and first ring portion 101 may comprise a plurality of projection portions extending therefrom. For example, cut-off portions 116 may be radially spaced around reduced diameter portion 112, and each of the projection portions may be aligned with a corresponding one of cut-off portions 116. Specifically, first inner portion 64 may swag the projection portions into the corresponding cut-off portion 116, such that at least a portion of each of the projection portions is positioned within corresponding cut-off portion 116. First inner portion 64 also may swag ring portion 101 in the direction toward annular space 118, such that at least a portion of first ring portion 101 is positioned within annular space 118 and contacts the adhesive applied to reduced diameter portion 112.

Figure 7:
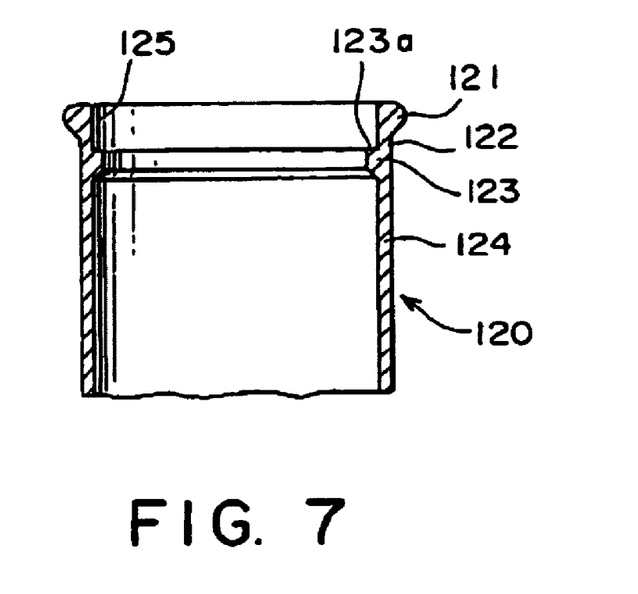
FIG. 7 is a cross-sectional view of a cup member manufactured by a method according to a second embodiment of the present invention.
Figure 8:
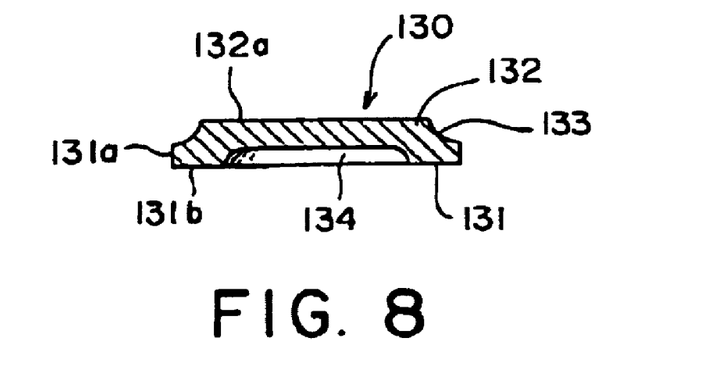
FIG. 8 is a cross-sectional view of a lid member manufactured by the method according to the second embodiment.

Referring to FIGS. 7 and 8, a cup member 120 and a lid member 130 of a piston 10 manufactured by a method according to a second embodiment of the present invention is depicted. The features and advantages of the second embodiment of the present invention are similar to the features and advantages of the first embodiment of the present invention. Therefore, those similar features and advantages of the first embodiment and the second embodiment of the present invention are not discussed further with respect to the second embodiment of the present invention. Referring to FIG. 7, in the second embodiment, cup member 120 may comprise a first ring portion 121, a second ring portion 122, a third ring portion 123, and a cylindrical portion 124. Second ring portion 122 and third ring portion 123 form a peripheral surface of piston head 10b. Second ring portion 122 may have a thickness which is about equal to a thickness of cylindrical portion 124, and a thickness of third ring portion 123 may be greater than the thickness of second rings portion 122 and cylindrical portion 123. Second ring portion 122 may have an outer diameter which is about equal to an outer diameter of third ring portion 123 and cylindrical portion 124. Moreover, an inner diameter of second ring portion 122 may be about equal to an inner diameter of cylindrical portion 124, and also may be greater than an inner diameter of third ring portion 123. Third ring portion 123 may have a receiving surface 123a, e.g., a ring-shaped receiving surface.

First ring portion 121 forms a brim of cup member 120. An outer diameter of first ring portion 121 may be greater than the outer diameter of second ring portion 122 measured from the center of piston head 10b, and an inner diameter of first ring portion 121 may be greater than or equal to the inner diameter of second ring portion 122 measured from the center of piston head 10b. Moreover, first ring portion 121, second ring portion 122, third ring portion 123 may form an annular recess 125, and receiving surface 123a forms the bottom of annular recess 125.

Referring to FIG. 8, lid member 130 may comprise an end portion 131, e.g., a ring-shaped end portion or a disc-shaped end portion, and a reduced diameter portion 132. A recess 134 may be formed in end portion 131 and reduced diameter portion 132 to reduce the weight of lid member 130. A periphery 131a of end portion 131 may have an outer diameter which is less than or about equal to the inner diameter of second ring portion 122. End portion 131 also may have a contact surface 131b, e.g., a ring-shaped contact surface which contacts receiving surface 123a when lid member is positioned inside cup member 120. Moreover, reduced diameter portion 132 may have a surface 132a which forms an end surface of piston head 10b, and a periphery 133 having has an outer diameter which decreases between end portion 131 and surface 132a.

Figure 9:
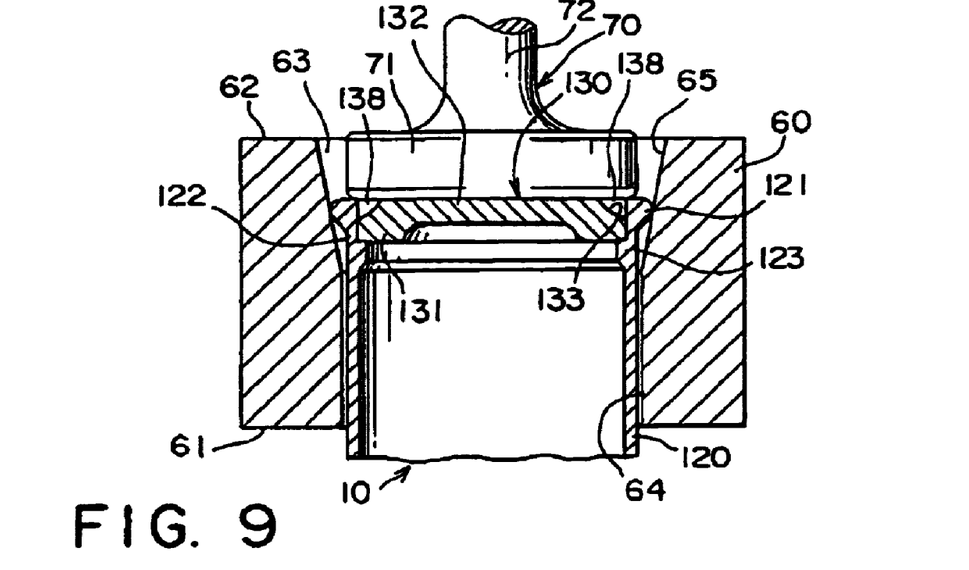
FIG. 9 is a cross-sectional view depicting a step included in the method according to the second embodiment.

Referring to FIG. 9, in this embodiment, cup member 120 may be inserted in opening 63 from second end 62, such that at least a portion of cylindrical portion 124 is aligned with first inner portion 64, first ring portion 121, second ring portion 122, and third ring portion 123 are aligned with second inner portion 65, and shoe supporter 10a extends beyond first end 61. First semi-circular portion 60a or second semi-circular portion 60b, or both, subsequently may be fitted to surround cylindrical portion 124, and semi-circular portion 60a and second semi-circular portion 60b then may be fixed to each other. In another embodiment, if shoe supporter 10a does not extend beyond cylindrical portion 124 in a radial direction, opening 63 may be formed, such that swaging tool 60 may be single body having opening 63 formed therethrough, i.e., swaging tool 60 is not divided into first semi-circular portion 60a and second semi-circular portion 60b. In this embodiment, cup member 100 simply may be inserted in opening 63 from second end 62, such that at least a portion of cylindrical portion 124 is surrounded by first inner portion 64.

In any of the above-described embodiments, an adhesive may be applied to curved periphery 133 of reduced diameter portion 132, and end portion 131 and reduced diameter portion 132 subsequently may be inserted into cup member 110, such that surface 131b of lid member 130 contacts receiving surface 123a of third ring portion 123, periphery 131a contacts an inner surface of second ring portion 122, and reduced diameter portion 132 is aligned with first ring portion 121. Moreover, an annular groove 138 may be formed by an inner surface of first inner portion 121 and curved periphery 133.

Figure 10:
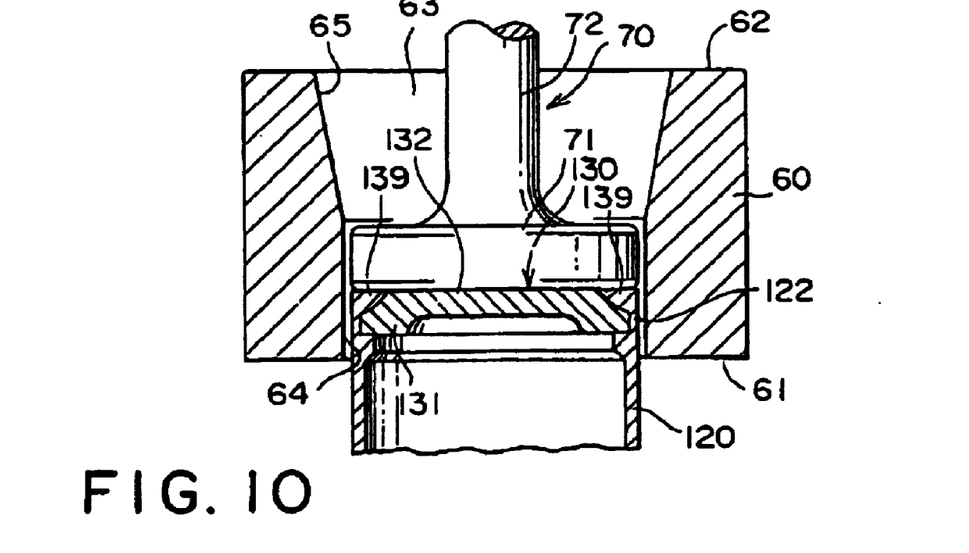
FIG. 10 is a cross-sectional view depicting another step included in the method according to the second embodiment.

Referring to FIG. 10, pushing tool 70 may be used to push cup member 120 and lid member 130 toward first end 61 of swaging tool 60. When lid member 130 and cup member 120 are pushed within first inner portion 64, disc portion 72 of pushing tool 70 closes annular groove 138. Moreover, first inner portion 64 swags first ring portion 121 in a direction toward annular groove 138, such that at least a portion of first ring portion 121 is positioned within annular grove 138 and contacts the adhesive applied to curved periphery 133. Consequently, cup member 120 may be fixed to lid member 130 without form a gap between cup member 120 and lid member 130. Lid member 130 and cup member 120 also may be modified in accordance with the embodiment of the present invention depicted in FIG. 6.

Figure 11:
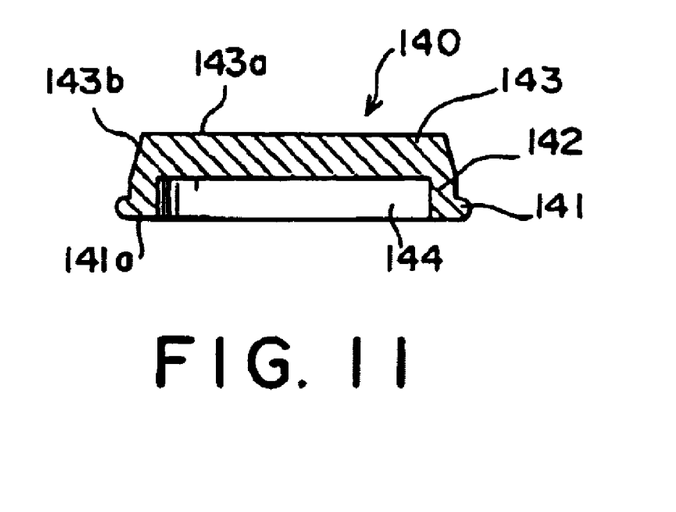
FIG. 11 is a cross-sectional view of a lid member manufactured by a method according to a third embodiment of the present invention.
Figure 12:
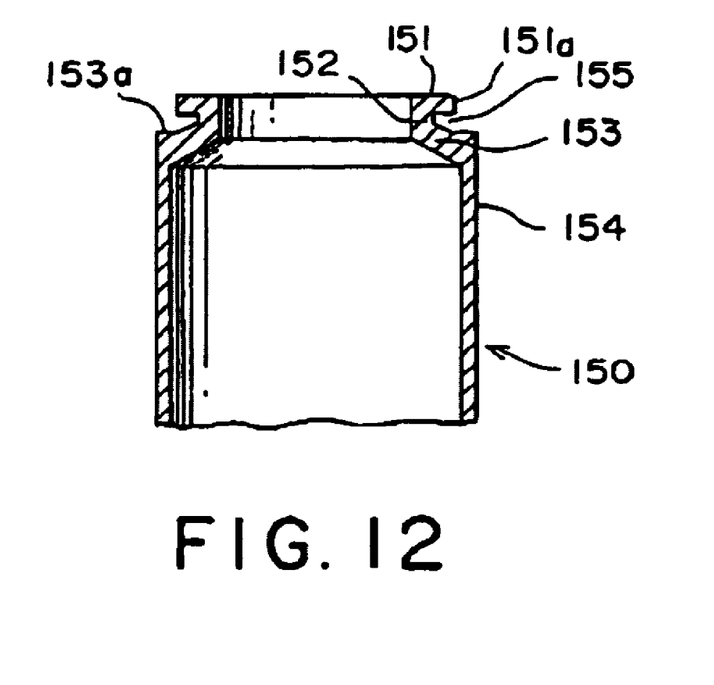
FIG. 12 is a cross-sectional view of a cup member manufactured by the method according to the third embodiment.

Referring to FIGS. 11 and 12, a cup member 150 and a lid member 140 of a piston 10 manufactured by a method according to a third embodiment of the present invention is depicted. The features and advantages of the third embodiment of the present invention are similar to the features and advantages of the above-described embodiments of the present invention. Therefore, those similar features and advantages of the above-described embodiments and the third embodiment of the present invention are not discussed further with respect to the third embodiment of the present invention. Referring to FIG. 11, in the third embodiment, lid member 140 may comprise a first ring portion 141, a second inner portion 142, and a disc portion 143. Lid member 140 may have a recess 144 formed therein, which may be shallower than the recess formed in lid member 110 or 130, or both. First ring portion 141 forms a brim of lid member 140, and disc portion 143a has a surface 143a which forms an end surface of piston head 10b. Disc portion also may have a periphery 143b which may be tapered toward end surface 143a, or may have a cylindrical shape. An outer diameter of second ring portion 142 may be about equal to an outer diameter of piston head 10b, and an outer diameter of first ring portion 141 may be greater than the outer diameter of second ring portion 102. In an embodiment, an inner diameter of first ring portion 141 may be equal to an inner diameter of second ring portion 142. In another embodiment, the inner diameter of first ring portion 141 may be greater than the inner diameter of second inner portion 142. Moreover, first ring portion 141 may have a receiving surface 141a which is one end surface of lid member 140.

Referring to FIG. 12, cup member 150 may comprise an end portion 151, e.g., a ring-shaped, end portion, a reduced diameter portion 152, a connection portion 153, and a cylindrical portion 154. Connection 153 and cylindrical portion 154 may form a peripheral surface of piston head 10b. Connection portion 153 and cylindrical portion 154 each may have an outer diameter which is about equal to the outer diameter of second ring portion 142. Moreover, connection portion 153 may have a constant inner diameter, or may have an inner diameter which increases between a reduced diameter portion 152 and cylindrical portion 154. Connection portion 153 also may have a contact surface 153a which contacts receiving surface 141a of first ring portion 141. A periphery 151a of end portion 151 may have an outer diameter which may be smaller than or about equal to the inner diameter of second ring portion 142. Moreover, end portion 151, reduced diameter portion 152. and connection portion 153 may form an annular groove 155.

Figure 13:
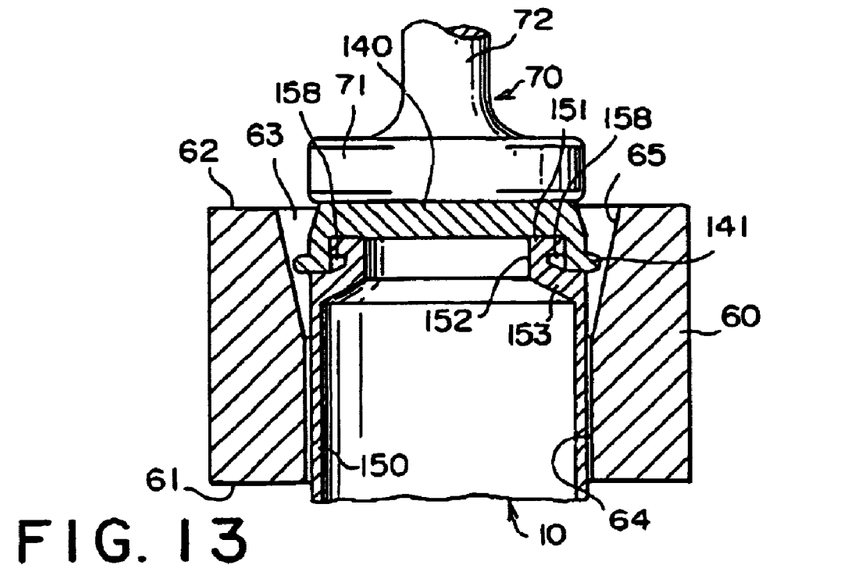
FIG. 13 is a cross-sectional view depicting a step included in the method according to the third embodiment.

Referring to FIG. 13, in this embodiment, an adhesive may be applied to the periphery of reduced diameter portion 152, and end portion 151 and reduced diameter portion 152 subsequently may be inserted into recess 144, such that contact surface 153a of connection portion contacts receiving surface 141a of lid member 140, periphery 151a contacts an inner surface of second inner portion 142, and reduced diameter portion 152 is aligned with first ring portion 141. Moreover, an annular space 158, which is a portion of annular groove 155, may be formed by first ring portion 141 and reduced diameter portion 152.

Figure 14:
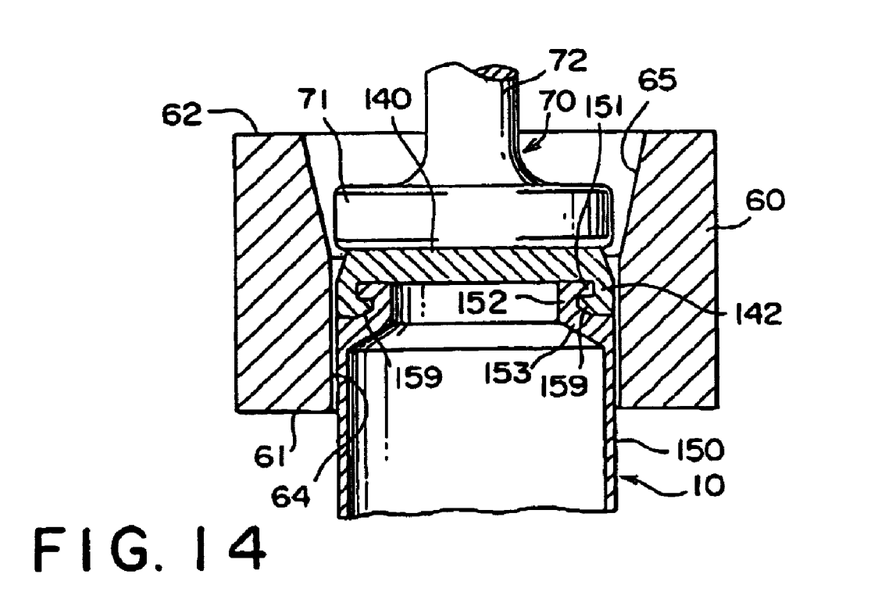
FIG. 14 a cross-sectional view depicting another step included in the method according to the third embodiment.
Figure 15:
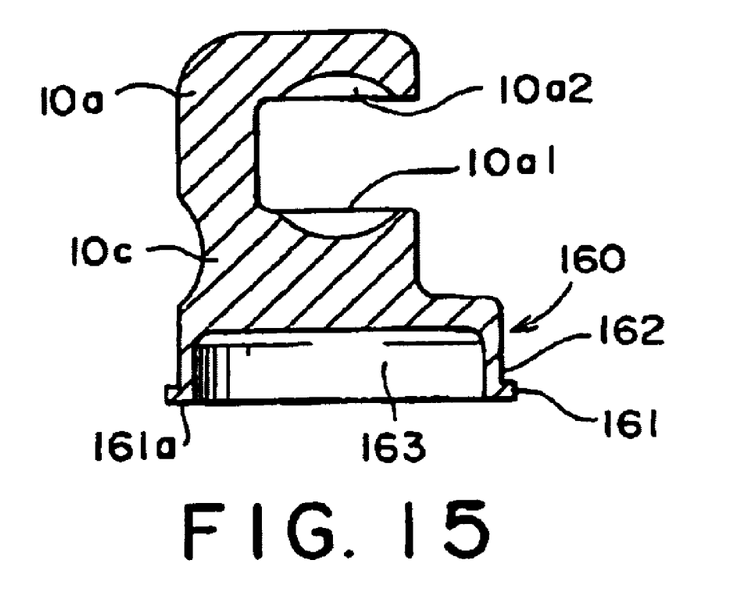
FIG. 15 is a cross-sectional view of a lid member manufactured by a method according to a fourth embodiment of the present invention.

Referring to FIG. 14, pushing tool 70 may be used to push cup member 150 and lid member 140 toward first end 61 of swaging tool 60. When lid member 140 and cup member 150 are pushed within first inner portion 64, first inner portion 64 swags first ring portion 141 in a direction toward annular space 158, such that at least a portion of first ring portion 141 is positioned within annular space 158 and contacts the adhesive applied to the periphery of reduced diameter portion 152. Consequently, cup member 150 may be fixed to lid member 140 without forming a gap between cup member 150 and lid member 140. Lid member 140 and cup member 150 also may be modified in accordance with the embodiment of the present invention Referring to FIGS. 15 and 16, a cup member 170 and a lid member 160 of a piston 10 manufactured by a method according to a fourth embodiment of the present invention is depicted. The features and advantages of the fourth embodiment of the present invention are similar to the features and advantages of the above-described embodiments of the present invention. Therefore, those similar features and advantages of the above-described embodiments and the fourth embodiment of the present invention are not discussed further, with respect to the fourth embodiment of the present invention. Referring to FIG. 15, in the fourth embodiment, lid member 160 may comprise a first ring portion 161 and a second ring portion 162, which are substantially similar to first ring portion 141 and second ring portion 142, respectively. Lid member 160 may have a recess 163 formed therein, which may be shallower than the recess formed in lid member 110 or 130, or both. Moreover, first ring portion 161 may have a receiving surface 161a which is one end surface of lid member 160.

Figure 16:
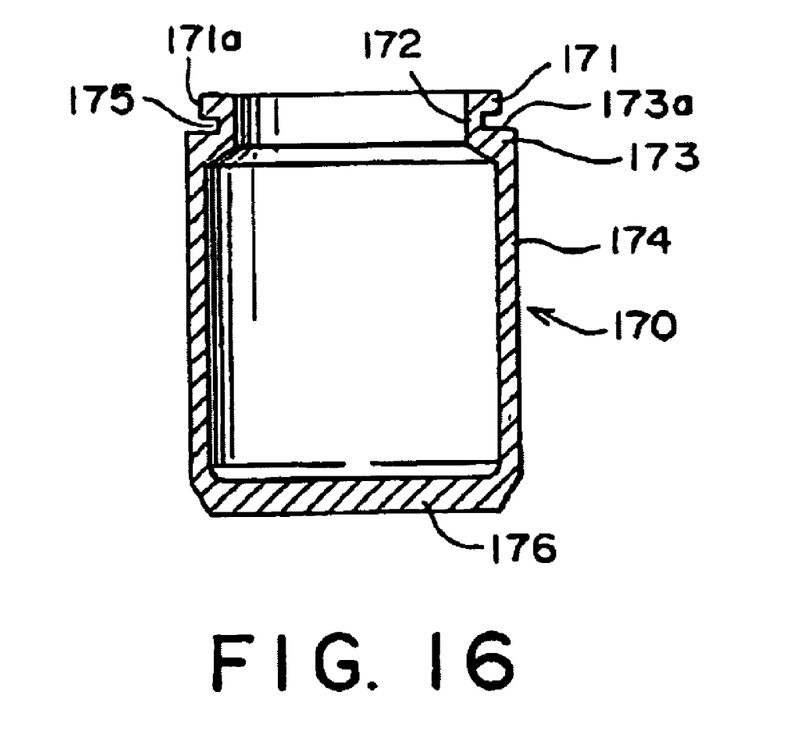
FIG. 16 is a cross-sectional view of a cup member manufactured by the method according to the fourth embodiment.

Referring to FIG. 16, cup member 170 may comprise an end portion 171, a reduced diameter portion 172, a connection portion 173, and a cylindrical portion 174, which are substantially similar to end portion 151, reduced diameter portion 152, connection portion 153, a cylindrical portion 154, respectively. Connection portion 173 may have a contact surface 153a which contacts receiving surface 161a of first ring portion 161, and end portion 171 may have a periphery 171a similar to periphery 151a. Moreover, end portion 171, reduced diameter portion 172, and connection portion 173 may form an annular groove 175. In this embodiment, a bottom of cup member 170 may comprise a tapered end disc portion 176 which is an end surface of piston head 10b.

Figure 17:
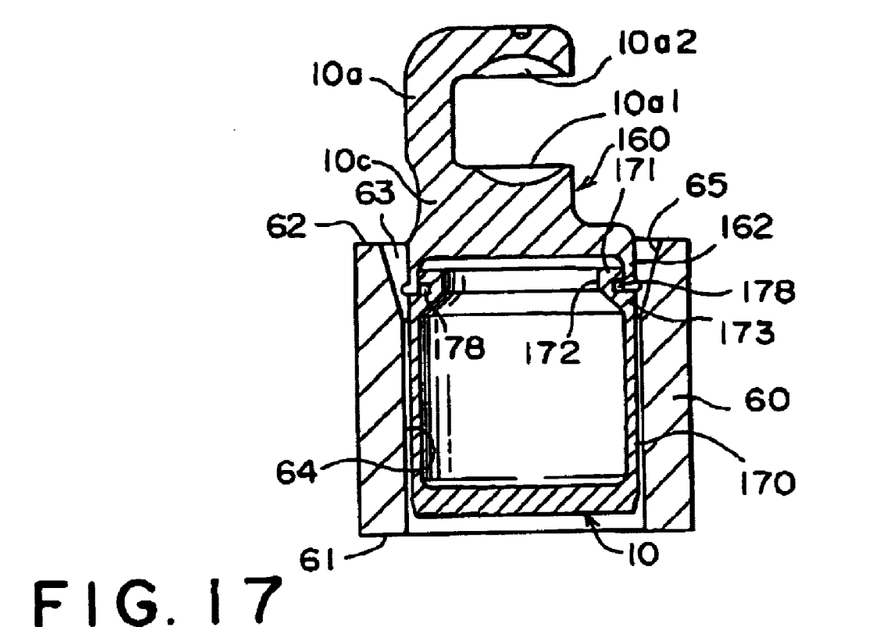
FIG. 17 is a cross-sectional view depicting a step included in the method according to the fourth embodiment.

Referring to FIG. 17, in this embodiment, end portion 171 and reduced diameter portion 172 may be inserted into recess 163, in a manner similar to the third embodiment, such that an annular space 178, which is a portion of annular groove 175 may be formed by first ring portion 171 and reduced diameter portion 172.

Figure 18:
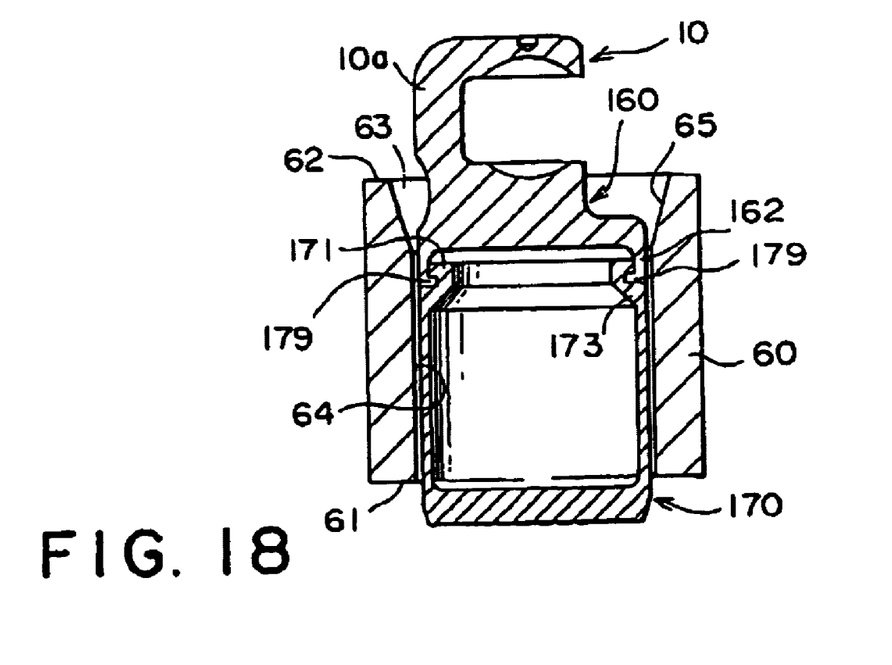
FIG. 18 is a cross-sectional view depicting another step included in the method according to the fourth embodiment.

Referring to FIG. 18, in this embodiment, neck portion 10c and shoe supporter 10a may be used to push cup member 170 and lid member 160 toward first end 61 of swaging tool 60. When lid member 160 and cup member 170 are pushed within first inner portion 64, first inner portion 64 swags first ring portion 161 in a direction toward annular space 178, such that at least a portion of first ring portion 161 is positioned with annular space 178. Consequently, cup member 170 may be fixed to lid member 160 without forming a gap between cup member 170 and lid member 160. Lid member 160, and cup member 170, also may be modified in accordance with the embodiment of the present invention depicted in FIG. 6.

While the invention has been described in connection with preferred embodiments, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification and the described examples are consider exemplary only, with the true scope of the invention indicated by the following claims.

What is claimed is:

1. A method of manufacturing a piston using a swaging tool, wherein the swaging tool has an opening formed therethrough, and the opening comprises a first inner portion extending from a first end of the swaging tool, wherein an inner diameter of the first inner portion is substantially constant; and a second inner portion extending from a second end of the swaging tool, wherein the second inner portion is tapered and is formed integrally with the first inner portion, such that an inner diameter of the second inner portion at the second end of the swaging tool is greater than an inner diameter of the second inner portion at the first inner portion, wherein the piston comprises a first member comprising a first ring portion having an outer diameter which is greater than the inner diameter of the first inner portion; a second ring portion connected to the first ring portion, wherein the second ring portion has an outer diameter which is about equal to the diameter of the first inner portion; and a third ring portion connected to the second ring portion; and a second member comprising an end portion having an outer diameter which is about equal to an inner diameter of the second ring portion; and a reduced diameter portion connected to the end portion, wherein the reduced diameter portion has an outer diameter which is less than the outer diameter of the end portion, the method comprising the steps of:

positioning at least one portion of the first member within the second inner portion via the second end of the swaging tool;

positioning at least one portion of the second member within the second inner portion via the second end of the swaging tool, such that the end portion contacts the second ring portion and the reduced diameter portion is substantially aligned with the first ring portion to create an annular space adjacent to the first ring portion and the reduced diameter portion wherein an end surface of the end portion contacts a receiving surface of the third ring portion, such that the annular space is a groove formed between the first ring portion and the reduced diameter portion; and subsequently swaging the first ring portion by moving the first ring portion in a direction toward the first end of the swaging tool, such that at least a portion of the first ring portion is positioned within at least a portion of the annular space to fix the first member to the second member and such that a third portion of said second member has an outer diameter substantially equal to the outer diameter of said second ring portion of said first member.

2. The method of claim 1, wherein the inner diameter of the second ring portion is about equal to an inner diameter of the first ring portion.

3. The method of claim 1, wherein the third portion is a connecting portion connected to the reduced diameter portion, wherein when the at least one portion of the second member is positioned within the second inner portion, a contact surface of the third portion contacts an end surface of the first ring portion, such that the first ring portion, the reduced diameter portion, and the third portion form the annular space.

4. The method of claim 1, wherein the reduced diameter portion comprises a recess formed therein.

5. The method of claim 1, wherein the step of swaging the first ring portion comprises the step of using a pushing tool to move the first ring portion in the direction toward the first end of the swaging tool, wherein the pushing tool comprises disc portion and a shaft portion connected to a center of the disc portion.

6. The method of claim 1, wherein a hardness of the first member is about equal to a hardness of the second member.

7. The method of claim 1, further comprising the step of applying an adhesive to at least a portion of the reduced diameter portion before the step of positioning the at least one portion of the second member within the second inner portion.

8. A piston manufactured by the method of claim 1.

9. A method of manufacturing a compressor comprising a piston which is manufactured using a swaging tool, wherein the swaging tool has an opening formed therethrough, and the opening comprises a first inner portion extending from a first end of the swaging tool, wherein an inner diameter of the first inner portion is substantially constant; and a second inner portion extending from a second end of the swaging tool, wherein the second inner portion is tapered and is formed integrally with the first inner portion, such that an inner diameter of the second inner portion at the second end of the swaging tool is greater than an inner diameter of the second inner portion at the first inner portion, wherein the piston comprises a first member comprising a first ring portion having an outer diameter which is greater than the inner diameter of the first inner portion; a second ring portion connected to the first ring portion, wherein the second ring portion has an outer diameter which is about equal to the diameter of the first inner portion; and a third ring portion connected to the second ring portion; and a second member comprising an end portion having an outer diameter which is about equal to an inner diameter of the second ring portion; and a reduced diameter portion connected to the end portion, wherein the reduced diameter portion has an outer diameter which is less than the outer diameter of the end portion, the method comprising the steps of:

positioning at least one portion of the first member within the second inner portion via the second end of the swaging tool;

positioning at least one portion of the second member within the second inner portion via the second end of the swaging tool, such that the end portion contacts the second ring portion and the reduced diameter portion is substantially aligned with the first ring portion to create an annular space adjacent to the first ring portion and the reduced diameter portion wherein a contact surface of the end portion contacts a receiving surface of the third ring portion, such that the annular space is a groove formed between the first ring portion and the reduced diameter portion; and subsequently swaging the first ring portion by moving the first ring portion in a direction toward the first end of the swaging tool, such that at least a portion of the first ring portion is positioned within at least a portion of the annular space to fix the first member to the second member and such that a third portion of said second member has an outer diameter substantially equal to the outer diameter of said second ring portion of said first member.

10. A compressor manufactured by the method of claim 9.

\* \* \* \* \*